(12) United States Patent
Jones et al.

(10) Patent No.: US 8,079,938 B2
(45) Date of Patent: Dec. 20, 2011

(54) BOXING AND MARTIAL ARTS FIGHT, TRAINER, AND GAME SYSTEM AND METHOD

(75) Inventors: Terry G. Jones, Austin, TX (US); Redza Shah, Austin, TX (US)

(73) Assignee: Nexersys Corporation, Austin, TX (US)

( * ) Notice: Subject to any disclaimer, the term of this patent is extended or adjusted under 35 U.S.C. 154(b) by 0 days.

(21) Appl. No.: 12/917,199

(22) Filed: Nov. 1, 2010

(65) Prior Publication Data

US 2011/0111924 A1 May 12, 2011

Related U.S. Application Data

(60) Provisional application No. 61/280,184, filed on Oct. 30, 2009, provisional application No. 61/337,652, filed on Feb. 5, 2010, provisional application No. 61/342,687, filed on Apr. 16, 2010, provisional application No. 61/343,795, filed on May 4, 2010, provisional application No. 61/401,819, filed on Aug. 19, 2010.

(51) Int. Cl.
*A63B 71/00* (2006.01)
(52) U.S. Cl. .................................. 482/8; 482/83; 482/84
(58) Field of Classification Search ............... 482/83–90, 482/1–9, 900–902; 434/247
See application file for complete search history.

(56) References Cited

U.S. PATENT DOCUMENTS

| | | | | |
|---|---|---|---|---|
| 4,940,228 A * | 7/1990 | Horvath et al. | ................. | 482/84 |
| 4,974,833 A * | 12/1990 | Hartman et al. | ................... | 482/3 |
| 5,716,302 A * | 2/1998 | Andersson | ...................... | 482/84 |
| 5,921,896 A * | 7/1999 | Boland | .......................... | 482/83 |
| 6,397,151 B1* | 5/2002 | Yamagishi et al. | ............. | 702/41 |
| 6,416,445 B1* | 7/2002 | Nelson et al. | ................... | 482/83 |
| 7,625,319 B2* | 12/2009 | Kang et al. | ....................... | 482/83 |
| 7,857,729 B2* | 12/2010 | Sullivan et al. | ................... | 482/4 |
| 2005/0288159 A1* | 12/2005 | Tackett | .......................... | 482/84 |
| 2008/0125293 A1* | 5/2008 | Ng | ................................. | 482/84 |

* cited by examiner

*Primary Examiner* — Glenn Richman
(74) *Attorney, Agent, or Firm* — The Law Firm of H. Dale Langley, Jr., P.C.

(57) ABSTRACT

A boxing or martial arts training and/or exercise device includes one or more punching pads locationally displaced and supported on a frame. Respective pads are positioned in support on the frame for punching and kicking. Each pad communicatively connects to one or more impact sensor. Each impact sensor communicatively connects to a control unit. The control unit is communicatively connected to a display. The impact sensor detects touches and taps to the pad and signals the control unit of the detection. Responsive to the detection, the control unit directs sequences shown in the display according to a fighting sequence, a training sequence, or other sequence. The control unit includes a user interface for selection among sequences, as well as for selection of various menu items for the respective types of sequences.

27 Claims, 9 Drawing Sheets

BOXING AND MARTIAL ARTS FIGHT, TRAINER, AND GAME SYSTEM AND METHOD

CROSS-REFERENCE TO RELATED APPLICATIONS

The present application is a conversion of and has benefit of priority of the following applications, each of which is co-pending and has at least one same inventor of the present application: U.S. Provisional Patent Application No. 61/280,184, titled "Boxing and Martial Arts Exercise or Game Method and Apparatus", filed Oct. 30, 2009; U.S. Provisional Patent Application No. 61/337,652, titled "Boxing and Martial Arts Exercise or Game Method and Apparatus", filed Feb. 5, 2010; U.S. Provisional Patent Application No. 61/342,687, titled "Boxing and Martial Arts Exercise or Game Method and Apparatus", filed Apr. 16, 2010; U.S. Provisional Patent Application No. 61/343,795, titled "Boxing and Martial Arts Exercise or Game Method and Apparatus", filed May 4, 2010; and U.S. Provisional Patent Application No. 61/401,819, titled "Boxing and Martial Arts Exercise or Game Method and Apparatus", filed Aug. 19, 2010. Each of these provisional applications is hereby incorporated herein by this reference.

TECHNICAL FIELD

The invention generally relates to punching and kicking machines for coaching, training, and workouts, and more specifically relates to punching and kicking systems and methods with automated interactive components providing feedback for techniques, training, and exercise.

BACKGROUND

Boxing and martial arts are popular sports and also are often used as exercise regimens (references in this disclosure to "boxing" include the broader category of all punching or striking activities, such as, for example, in martial arts with hand or foot punches or other striking maneuvers or actions). Because of the popularity of boxing, there have been a number of boxing- and game-related apparatuses over the years. These include devices as simple as punching bags (e.g., The BAS/Body Action System™ endorsed by Bas Ruttens) or as complicated as arcade electronic processor equipment (e.g., the Don King Boxing computer arcade game which employs the Wii™ apparatus from Nintendo of America Inc.). The BAS/Body Action System™ provides punching pads disposed on a rigid frame for hand, foot and/or head punch by a user. The Wii™ device is a handheld unit that incorporates accelerometers, which allow a user holding the Wii™ device in the hand to move the hand (i.e., shadow box into thin air) without hitting or contacting anything, to play a boxing video game operable on a devoted game console unit and a television set.

Simple punching bags (even in designs where pads are disposed on a frame, such as the BAS product) provide only a punching surface. The user must resort to a human coach or trainer to observe the punching and provide instruction or guidance in techniques, force, regimen and the like. Certain of these conventional punching bag devices may be packaged with a compact disk of video and/or sound instruction, but these do not operate in conjunction with punching bags for automated real-time detection or assessment of actual strikes or movements of the user.

The Wii™ apparatus for games senses transposition of a hand that is holding the apparatus during play of a boxing game operating on the game play unit. The device is not intended or used for actual striking or punching, and striking or punching while holding the device would likely lead to breakage. The apparatus is merely held in hand as the hand is moved through the surroundings in thin air, and thereby detection of the hand's movement in dimensional space is registered by the game play unit. The boxing game operates on the game play unit, and the hand-held Wii™ apparatus delivers an input signal to the game. The game proceeds through pre-programmed sequences that deliver audio and visual direction to the player for hand movements that will register game points. The user merely moves his hand holding the apparatus, but never actually strikes any surface. Based on extent of the user's hand movement in concert with the pre-programmed directions of the game, the user may score points in the game. The Wii™ apparatus in operation of the boxing game cannot instruct the game player as to proper techniques, force, regimen and the like in response to the player's action. For actual boxing training with strikes and punches, the game is insufficient to truly prepare, train and exercise for real boxing with physical contact. Of course, a game player punching a hand into thin air is not a realistic or real-life comparator for actual punching or kicking to encounter a tangible object.

What is needed are systems and methods for automated boxing instruction, preparation, and training, which assists in proper techniques, punch force, exercise regimen, and the like, without requiring a human coach or trainer but which could assist a coach or trainer if desired. Physical punching bags or pads for a user to strike would be advantageous. Further, interactive feedback to the user that teaches proper boxing technique, training, and exercise and/or informs the user how they are doing, would also be advantageous. In the past, certain arcade games have had limited functionality of single punching surface or object to score in the games. However, these games have provided only limited feedback to the user related to the game itself, and in any event the feedback has been devoted to purposes of the arcade game and not geared to instruction in true boxing instruction, preparation, and training. For instance, U.S. Pat. No. 5,733,193 is for an arcade game where a user hits a punching bag and the game tracks as user feedback how many times the bag is hit. The arcade game of the '193 patent, however, does not include any teaching or training of a user in proper boxing techniques, force, or exercise regimen, nor does the game include multiple punching bags for varying types of punching or kicking as would be desirable to mimic real-life boxing conditions.

It would therefore be desirable to provide new and improved systems and methods for boxing instruction, preparation, and training, which assist in proper boxing technique, punching force, exercise regimen, and the like. It would also be desirable to provide automated systems and methods for interactive feedback to boxers in real-time and based on actual determinants of boxing capability. It would be further desirable to provide systems and methods for boxing which are expandable and scalable for single-user and multi-user matches, communicative over communications networks, and substantially similar to real-life boxing scenarios and circumstances.

SUMMARY

An embodiment of the invention is a an interactive boxing apparatus including a frame, a series of arms connected to the frame and outwardly extending from the frame, one or more pad connected to respective ones of the series of arms, an impact sensor communicatively connected to each pad, a control unit communicatively connected with the impact sensor, and a display connected to the control unit.

Another embodiment of the invention is an interactive boxing apparatus including a movement resistive punch pad, a movement sensor communicatively connected to the punch pad, for detecting any movement of the punch pad, a processor connected to the movement sensor, responsive to detection by the movement sensor of any movement of the punch pad, a module communicatively connected to the processor, controlled by the processor responsive to movement of the punch pad on detection by the movement sensor, and a media display communicatively connected to the processor, the processor directs output by the media display in response to control of the module by the processor. Yet another embodiment of the invention is a method of boxing including outputting a media item on a display, detecting a punch to a pad by a sensor, signaling a controller by the sensor in response to the step of detecting, and controlling the media item on the display by the controller in response to the step of signaling.

Another embodiment of the invention is a method of boxing including providing a frame, a series of arms connected to the frame and outwardly extending from the frame, one or more pad connected to respective ones of the series of arms, an impact sensor communicatively connected to each pad, a control unit communicatively connected with the impact sensor; and a display connected to the control unit. The method further includes outputting a media item on the display, detecting movement of the one or more pad and an identity of the pad so moved, signaling a controller by the impact sensor with the identity of the pad so moved, and controlling the media item on the display by the controller in response to the step of signaling. The media item in the step of outputting selectively corresponds to the steps of detecting, signaling, and controlling for boxing instruction.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
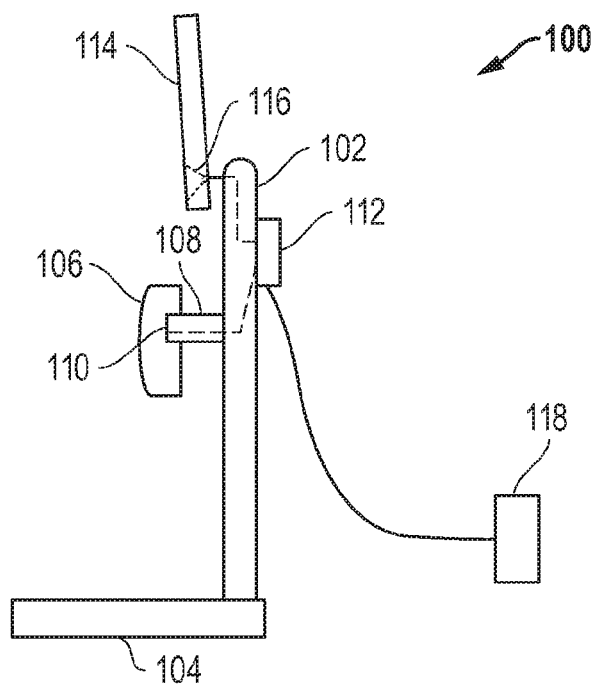
FIG. 1 illustrates a perspective view of a boxing apparatus, according to certain embodiments of the invention.

Referring to FIG. 1, a system 100 for boxing instruction, training, technique, and regimen includes an upright member 102 and a base 104 connected to the upright member 102. One or more force resisting member 108 is connected to or incorporated in the upright member 102. One or more strike pad 106 is disposed on the force resisting member 108.

One or more impact sensor 110 (shown in phantom in FIG. 1) is directly or indirectly coupled or communicatively connected with the one or more pad 106, sufficient for the impact sensor 110 to detect any force impact to the pad 106, for example, from touch, strike, or punch to the pad 106. One or more control unit 112 of the system 100 is communicatively connected to the one or more impact sensor 110 during operation of the system 100. The control unit 112 can, but need not necessarily, include or connect to a visual display 114, a speaker or similar audio device 116 (shown in phantom incorporated in the display 114 in FIG. 1) and/or another output apparatus or connected peripheral unit (not shown in FIG. 1) capable of communicating with a user of the system 100.

In operation, a user of the system 100 touches, strikes, or punches the pad 106 (or, if more than one pad 106, selectively chooses which pad 106 to touch or strike/punch), such as, for example, in a scenario of simulated boxing by the user. The impact sensor 110 coupled with the pad 106 detects the user's touch, strike or punch to the pad 106. The control unit 112 is alerted that the sensor 110 has detected the impact. The control unit 112 registers occurrence of impact to the pad 106, for example, including by storing a time of the impact and force of the impact. Responsive to the registration of the impact by the control unit 112, the control unit 112 then selectively instructs the user to take subsequent action. For example, in response to the detected impact, the control unit 112 initiates particular media output to the visual display 114 and/or the speaker 116, or otherwise, which output directs the user to again touch, punch, kick or otherwise impact the one or more pad 106 (of, if more than one of the pad 106 in the system 100, a select one or more of them) or other instruction. Other examples of such output controlled by the control unit 112 include, but are not limited to, instructions for technique, training, exercise regimen, and further operation of the system 100 by the user.

According to certain embodiments of the system 100, during use of the system 100, the one or more pad 106 is each moveable (e.g., via tensioned pivots and springs, or force resisting device) with respect to the upright member 102 in a generally lateral and generally perpendicular (as viewed from the left side in FIG. 1) relation to the upright member 102, a generally upward/downward and generally parallel (as viewed from the left side in FIG. 1) relation to the upright member 102, or combinations of these. In effect, each pad 106 has either two or three dimensions of movement with respect to the upright member 102. For example, the pad 106 can move via force towards the upright member 102 by compression or the like, the pad 106 can move left or right to the upright member 102 (when viewed from the left side in FIG. 1) by pivoting arms attaching the pad 106 to the upright member 102, the pad 106 can move upward or downward to the upright member 102 by pivoting arms attaching the pad 106 to the upright member 102, or the pad 106 can move through force in combinations of these. Embodiments can alternately provide force resistive movement of the pad 106 in other spatial dimensions or combinations, as per selection among types of connector assembly (e.g., arm, pivots, springs, joint and the like) for attaching the pad 106 to the upright member 102 for desired force resistance for boxing as herein disclosed.

Figure 2:
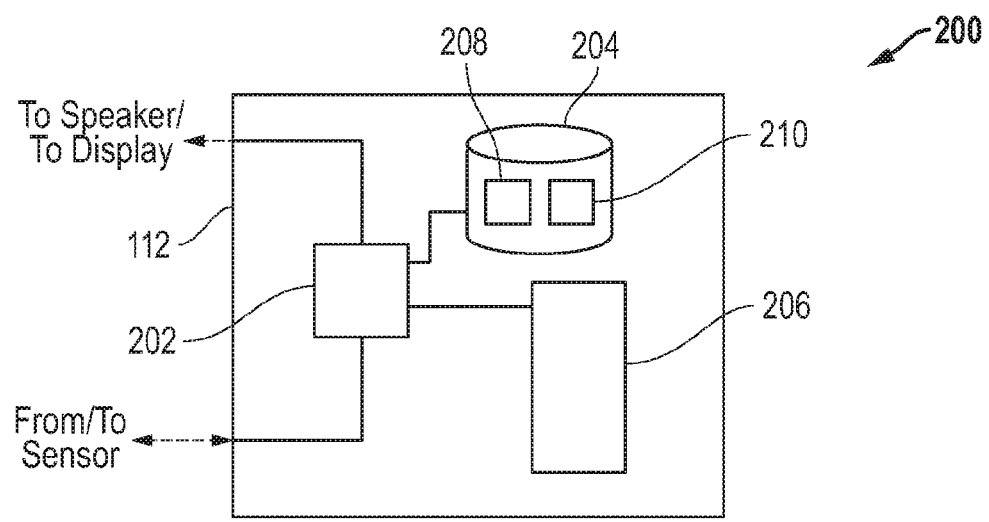
FIG. 2 illustrates a control unit of a boxing apparatus, according to certain embodiments.

Referring to FIG. 2, an exemplary control unit 200, such as may be employed in the system 100, includes a controller 202 communicatively connected to one or more of the impact sensor 110. The controller 202 may be implemented in hardware circuit(s), software program(s), or combinations of these. An example of the controller 202 is a processor or other control circuit, or pluralities or combinations of these, operating a software program stored in a computer readable non-transitory memory. The controller 202 is communicatively connected to an output apparatus that is interpretable to the user, for example, the visual display 114 and/or audio device 116 (each shown in FIG. 1). Memory 206 and data storage 204 are also connected to the controller 202 if a microprocessor or other circuit, for operation and store of the software program. A power source 118, such as an AC or DC electricity source, is connected to and supplies the control unit 112.

Figure 3:
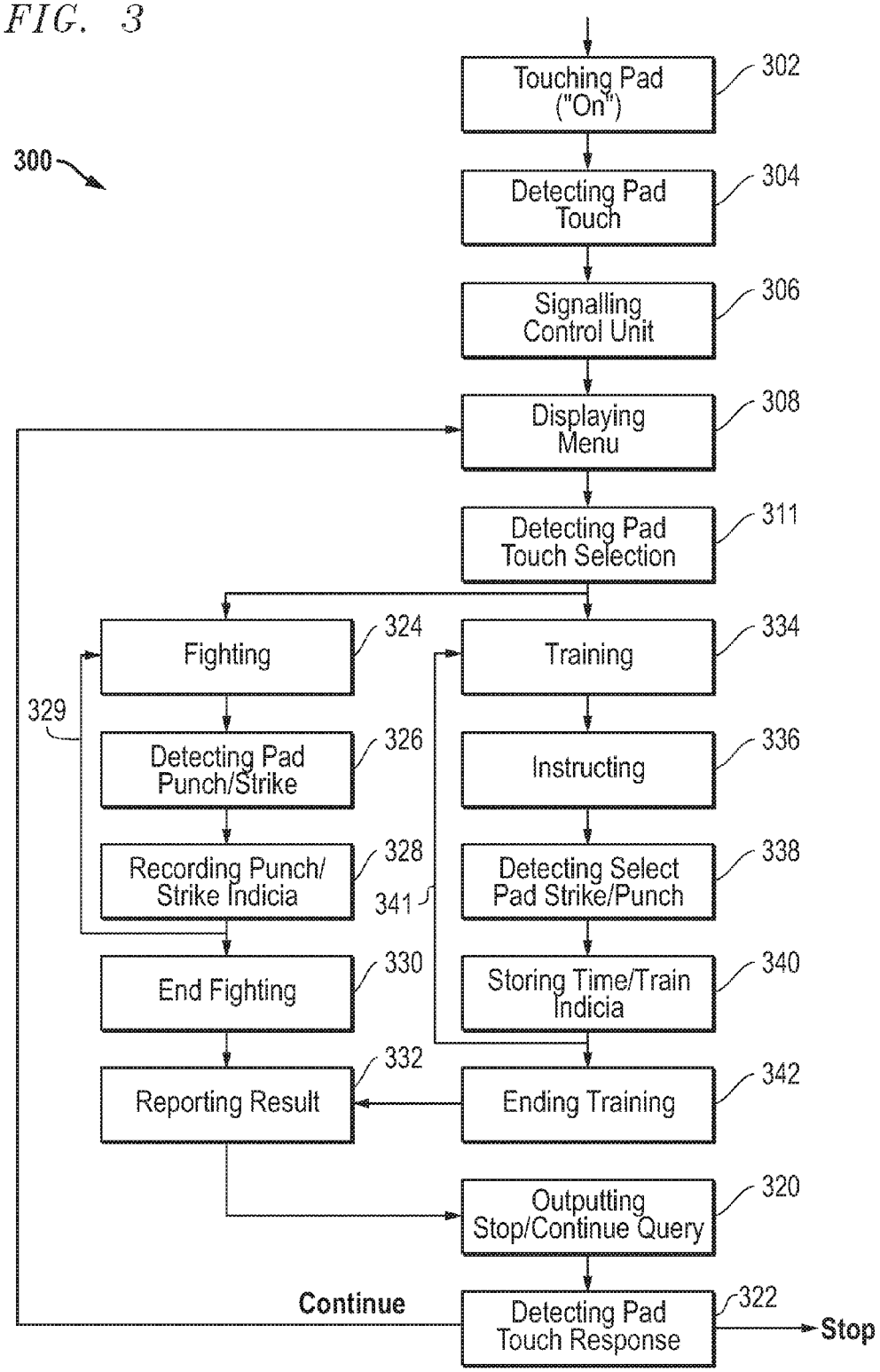
FIG. 3 illustrates a method of boxing by a boxing apparatus, according to certain embodiments of the invention.

Referring to FIG. 3, in conjunction with FIGS. 1 and 2, a method 300 of boxing fighting and training such as may be performed by the system 100 of FIG. 1 when supplied with power, commences with a step 302 of touch impact to one or more of the pad 106. If more than one pad 106, a selection of particular pad 106 (according to design of the system 100) commences the method 300. In certain embodiments, the step 302 is instigated through tap or touch of the pad 106, as compared to a strike or punch to the pad 106.

In a step 304, the touch to the pad 106 in the step 302 is detected by the impact sensor 110 for the pad 106. The control unit 112 is signaled in a step 306 that the impact sensor 110 detected the touch to the pad 106. Upon the step 306, the control unit 112, in a step 308, controls an output device of the system 100, for example, the display 114 and/or the speaker 116, to provide a readable or audible selection menu (not shown in Figures).

An item of the selection menu is chosen by user-input to the system 100, for example, touch of the pad 106 (or a select one or more of the pad 106, if more than one), and the pad touch for the item selected is detected in a step 310. Examples of possible items which may be selected from the menu may include Fighting or Training, but are not limited to these, and may include others or alternatives, such as Coaching (not shown in Figures) or others. Once the item selection is detected in the step 310, the control unit 112 processes and commences a selected routine, e.g., fighting, training, or other sequence, per the selected menu item. Examples of possible boxing routine include, for example, fighting sequences, training sequences, or others such as coaching sequences. Each boxing routine is, for example, hardware logic circuits, a software routine stored in a computer readable non-transitory memory, or combinations of these, processed by the control unit 112.

If Fighting 324 is selected, fighting sequences are commenced in a step 324. In the step 324, the control unit 112 processes a fight module 208 (shown in FIG. 2 as software stored in the data storage 204, but which can alternately be a software routine stored in another computer readable non-transitory memory, hardware logic circuits, and/or combinations). The fight module 208 is processed in the step 324 by the control unit 112 to output an avatar fighter displayed on the visual display 114, to output audio on the speaker 116, and/or to output to other media. The output of the processing by the control unit 112 includes, for example, data sets or files suitable for displaying and/or audibly depicting the avatar fighter having punch/strike locations of the fighter's body corresponding generally to relative position of the one or more pad 106 (i.e., such that the one or more pad 106 are positioned by the upright member 102 as would be approximated for the fighter if a standing opponent). If any pad 106 is punched or struck, the impact sensor 110 for the pad 106 detects the punch or strike in a step 326 and the control unit 112 is signaled of the detection. In a step 328, the control unit 112 registers one or more indicators of the strike or punch in response to the step 326.

The method 300 then proceeds with continued processing of the fight module 208 by the control unit 112 and output of additional fight sequences as shown by arrow 329 in FIG. 3, or otherwise the fight sequences are ended in a step 330. The fight sequences are ended in the step 330 either upon completed processing of the fight module 208 by the control unit 112 (such as at the end of a programmed routine of the module after fight sequences are output) or on receipt of an stop signal input to the control unit 112, for example, by an "off" or "end" mechanism of the system 100, such as through activation by a user of the system 100 of an off switch, entry of a key, punching in a particular sequence to the one or more pad 106, or other similar mechanism. Once processing of the fight module 208 is ended in the step 330, the control unit 112 reports a result in a step 332.

The result reported in the step 332 by the control unit 112 can be displays on the visual display 114 or audio of the speaker 116. These displays can provide information of statistics of registered punch/strike responses, measures of strike/punch count, accuracy and force, and/or other measures or information, such as information related to outcomes of the fighting sequences, comparisons to earlier fighting results, or others. Further in the reporting step 332, the control unit 112 can store the reported information and/or additionally process the result together with prior results of usage of the system 100 to yield a statistical comparison record (which may, but need not necessarily, be stored by the control unit). In certain embodiments, the control unit 112 in the reporting step 332 may label the result (or a record of it) with a tag, such as an identifier of the particular user of the system 100, a time or date indicator of that use, or other indicators for viewing or comparison at later time or place.

If rather than Fighting 324, Training 334 is selected in the step 311, training sequences are commenced in the step 334. In the step 334, the control unit 112 processes a train module 210 (shown in FIG. 2 as software stored in the data storage 204, but which can alternately be a software routine stored in another computer readable non-transitory memory, hardware logic circuits, and/or combinations). The train module 210 is processed in the step 334 by the control unit 112 to output a depiction of the one or more pad 106 for display on the visual display 114, for audio on the speaker 116, and/or to other media. The output of the control unit 112 on processing of the train module 210 includes, for example, data sets or files suitable for displaying and/or audibly depicting the one or more pad 106 and a prescribed selection of sequential ones of the pad 106. As each pad 106 is selected in sequence, the pad 106 may subsequently be punched or struck as boxing training. Speed of sequential selection of the one or more pad 106 is controlled by the control unit 112 according to the processed train module 210. If any pad 106 is punched or struck, the impact sensor 110 for the pad 106 detects the punch or strike in a step 338 and the control unit 112 is signaled of the detection. In a step 340, the control unit 112 stores one or more indicators of the strike or punch in response to the step 338.

The method 300 then proceeds with continued processing of the train module 210 by the control unit 112 and output of additional train sequences as shown by arrow 339 in FIG. 3, or otherwise the train sequences are ended in a step 342. The train sequences are ended in the step 342 either upon completed processing of the train module 210 by the control unit 112 (such as at the end of a programmed routine of the module after train sequences are output) or on receipt of an stop signal input to the control unit 112, for example, by an "off" or "end" mechanism of the system 100, such as through activation by a user of the system 100 of an off switch, entry of a key, punching in a particular sequence to the one or more pad 106, or other similar mechanism. Once processing of the train module 210 is ended in the step 330, the control unit 112 reports a result of the steps of Training 339 in a step 332.

As with the result reported in the step 332 by the control unit 112 on end of processing of the fight module 208, the result can be displayed on the visual display 114 or audio of the speaker 116. These displays can provide information, such as with Fighting 324, of statistics of registered punch/strike responses, measures of strike/punch count, accuracy and force, and/or other measures or information, such as information related to outcomes of the fighting sequences, comparisons to earlier fighting results, or others. Further in the reporting step 332, the control unit 112 can store the reported information and/or additionally process the result together with prior results of usage of the system 100 to yield a statistical comparison record (which may, but need not necessarily, be stored by the control unit 112). The control unit 112 in the reporting step 332 may also label the result (or a record of it) with a tag in certain embodiments, such as an identifier of the particular user of the system 100, a time or date indicator of that use, or other indicators for viewing or comparison at later time or place.

In effect, Fighting 324 occurs against the output avatar fighter. In the fight sequences, the avatar fighter moves, punches, strikes, and otherwise responds (albeit through media graphics) to a system user's strikes and punches. Training 334, however, occurs through pad selection of the system and the user's punch and strike of selected pad. Varied levels of competency of the user may be selected by the user or the system, such as Beginner, Intermediate, Advanced, Expert or others, through menu items displayed via output of the control unit 112 on selection for Fighting 324 or Training 334 (or at other point in use of the system). Moreover, real-time results of the user's strike and punch actions may be displayed via output of the control unit 112 in either scenario. Real-time results may include, for example, strike and punch Accuracy, Count, Power, and Points Scored. In certain embodiments, the control unit 112 includes modules for processing heart rate and/or calories used by the user of the system during Fighting 324 or Training 334. Various embodiments can provide for particular regimen of Rounds or Bouts, in follow-up sequence, such as would be encountered by the system user in practice or training for boxing or general exercise through boxing. Other embodiments can allow for customization of the fight sequences and/or the train sequences, such as increase or decrease of Rounds, time of Rounds or Bouts, different sequences or times according to day of the week or period, play of boxing instruction tutorials as system output (e.g., instruction in techniques), adjustment of output volume or display, selection among specific Rounds or variation of sequences per Round, and custom routines operable by the control unit in the system.

Figure 4:
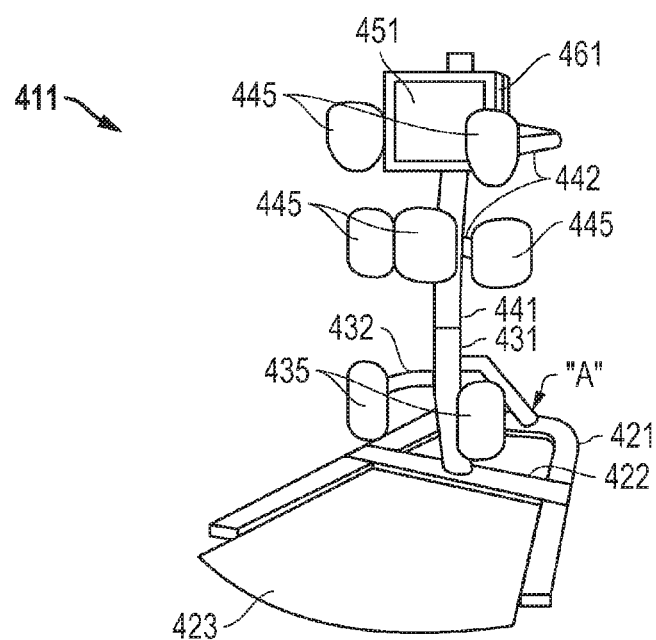
FIG. 4 illustrates a perspective view of an exemplary embodiment of a boxing apparatus of a series of arms and pads supported by a frame, according to certain embodiments of the invention.

Referring to FIG. 4, an exemplary embodiment of a boxing apparatus 411 according to FIG. 1 includes a u-shaped base 421 designed to rest on a floor, the ground, or other support surface. The base 421 is attached to a cross bar 422. The cross bar 422 provides added stability to the base 421 and apparatus 411. In certain embodiments, the cross bar 422 can, but need not necessarily, be formed as part of and incorporated with the base 421. For stability when the apparatus 411 is being punched, the base 421 is also attached (or incorporated) to a mat 423. The mat 423 is sized so that a user of the apparatus 411 can stand on mat 423 when striking the apparatus 411. The weight of the user on mat 423 further prevents the apparatus 411 from tipping over backwards or from overly swaying when the apparatus 411 is hit. In certain embodiments, an additional stability member (not shown in FIG. 4) may, but need not necessarily, extend from a closed portion (identified in FIG. 4 by arrow "A") of the u-shaped base 421 towards a back side (in the perspective view of FIG. 4) of the frame member 441 to further stabilize the apparatus 411.

Attached to the cross bar 422 and rising vertically from the cross bar is a lower frame member 431. The lower frame member 431 has arms 432 that are attached to kicking pads 435. Lower frame member 431 may be hollow so that telescoping upper frame member 441 can slide into and out of member 431. A retaining member, such as a hand screw (not shown in FIG. 4), maintains the upper from member 441 in select extension from the lower frame member 431 when the apparatus is in use for boxing by a user. This telescoping aspect of upper frame member 441 allows the top portion of the apparatus to be adjusted to different heights depending on the height or particular desires of a user.

Upper frame member 441, in at least one embodiment of the invention, is a single vertical column, pipe, rod, or protrusion that has a series of arms 442 (not all are visible in FIG. 4) which are attached to a series of punching pads 445. In the embodiment of the invention shown in FIG. 4, there are five (5) punching pads 445 of the upper frame member 441 which are positioned such that each pad represents a different type of punch in boxing or martial arts (e.g., a body punch from the users left, a body punch from the users right, a head punch from the user's left, a head punch from the user's right and an uppercut). Punching pads 445 and kicking pads 435 may be made of any of a number of different materials and mixes of materials. For example the pads 445, 435 may be very similar to the focus mitts used by boxing or martial arts trainers who wear them on their hands during sparring or training (e.g., a foam or sponge type material covered by leather).

Punching pads 445 may be angled such that they face either inwardly or outwardly from the vertical plan defined by frame members 431 and 441 and cross bar 422. This angling of punching pads 445 is dependent on the location of the pad. For example, upper pads approximating punches to the head may be angled inwardly (for example, between about 15-35 degrees and more preferably about 25 degrees inward). On the other hand, the lower pads 435 (approximating kidney or leg punches) may be angled outwardly (for example, at an angle between about 5-20 degrees and most preferably at an outward angle of about 12 degrees). The center body pad 445 (located as middle pad 445 in FIG. 4) may be at a "head on"

angle (for example, of about 0 degrees but with an upper cut angle of about 20-40 degrees or preferably about 30 degrees). Although other pad angles are possible, the pad is positioned in each instance to allow a user to hit punching pads 445 with their left or right hand in a way that approximates the user sparring with an actual person or a trainer.

Figure 5:
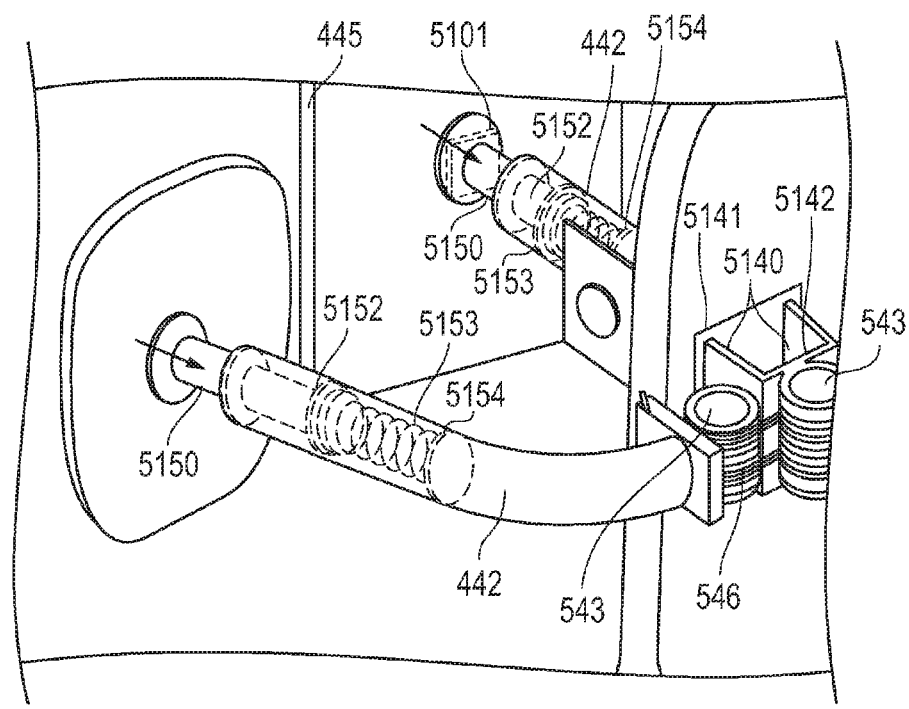
FIG. 5 illustrates a partial cutaway view of certain arms, pads and frame of an exemplary embodiment of a boxing apparatus (such as the embodiment of FIG. 4), according to certain embodiments of the invention.

Referring to FIG. 5, in conjunction with FIG. 4, the punching pads 445 and kicking pads 435 each contain or communicatively connect to one or more impact sensor 5101 (not visible in FIG. 4, but shown in FIG. 5 in phantom). The impact sensor 5101 can be any of a number of different types of impact or motion sensors (e.g., piezo sensors, contact switches, potentiometers, acoustical sensors, beam interruption sensors and so forth). In certain embodiments, the one or more sensor 5101 is each a respective three axis accelerometer. In addition, punching pads 445 and kicking pads 435 may include one or more light-emitting diode (LED) or other emitter that either emits a visible or audible signal or lights up or turns off according to what controller 461 or sensor 5101 directs it to do as to the respective pads 445, 435.

Each arm 442 has a cylindrical pivot point 543 and a rotational biasing means 546. When pad 445 is struck, for example, the force causes arm 442 to rotate/swing toward the rear of the apparatus 411 (as shown in the perspective of FIG. 4) and against the rotational bias of bias means 546. After the contact on pad 445, bias means 546 causes arm 442 to rotate/swing around pivot cylinder 543 back into the normal unbiased position. Rotational biasing means 546 can be a torsion spring or other bias device. Rotational biasing means 546 rests against stop 5140 which gives biasing means 546 and accordingly arm 442 some pre-tension.

Arm 442 and pivot point 543 are connected to upper frame 441 through housing 5142. In order to further minimize the rotational force on upper frame 441 (over and above rotational biasing means 546) there is a compressible attachment means 5141 between upper frame 441 and housing 5142. Compressible attachment means 5141 can a rubber block or similar shock dampener.

The back of pad 445 has a pad attachment means 5150 that connects pad 445 with arm 442 (pad attachment means 5150 can be an integral part of pad 445 or simply attached to the back of pad 445). In the embodiment shown in FIG. 4, attachment means 5150 is a cylindrical piston that slides into the interior diameter of arm 442. As pad 445 is struck, this force moves attachment means 5150 toward the back of the apparatus and into the hollow interior of arm 442. In order to cushion the force of the blow, the interior of arm 442 has two different force absorbing mechanisms. As pad attachment means 5150 moves backward into arm 442 it first hits solid compression material 5152 that compresses and absorbs some of the force of the blow. In addition, the material 5152 slides backward into compression spring 5153 that serves as another way to dampen the force of the blow to pad 445. Compression spring 5153 is forced back against stops 5154. In one embodiment compression spring 4153 is approximately about 4-6 inches long, although other lengths are possible depending on application.

In summary, as pad 445 is struck it moves backward through attachment means 5150 into arm 442. This force causes the various springs, foam and rubber compression materials to flex and then return to their original positions so that pad 445 is ready to be struck again. The swinging and compression motions are intended to approximate the feel that a user would have if they were hitting focus mitts held by a real life trainer. In other words the swinging and compression should approximate the types of motions one would have with the shoulders and elbows of a boxing or mixed martial arts (MMA) trainer during a training session.

The arm configuration (but not necessarily the angle of the pads) of arms 442 shown in FIGS. 4 and 5 for punching pads 445 may, but need not necessarily, be similar to the arm configuration for arms 432 used for lower kicking pads 435.

Figure 6:
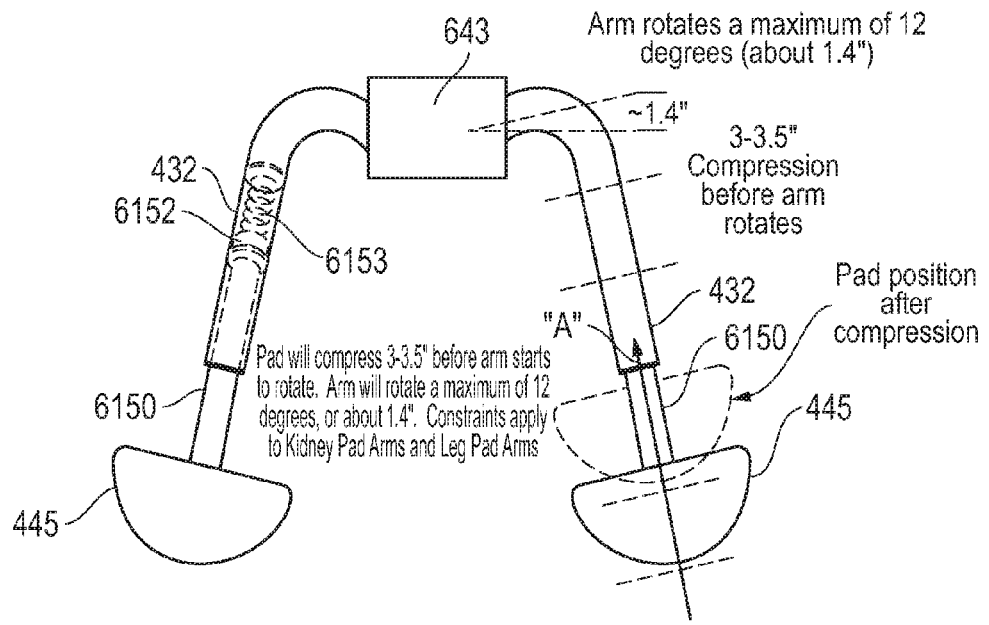
FIG. 6 illustrates a top view of an orientation of two arms and pads of an exemplary embodiment of a boxing apparatus (such as the embodiment of FIG. 4), according to certain embodiments of the invention.

Referring to FIG. 6, in conjunction with FIGS. 4 and 5, an exemplary embodiment of configuration for lower pads 435 (i.e. kidney pads and leg pads) and their corresponding pad arms 432 is similar to that of the upper pads 445. In particular in the embodiment, the pad attachment means 6150 (e.g., a piston) enters hollow arm 432 and impacts compression material 6152 and compression spring 6153 (similar to the compression material 5152 and compression spring 5153 shown in FIG. 5). On impact to the lower pad 435 (shown as arrow "A" in FIG. 6), the attachment means 6150 compresses material 6152 and spring 6153, for example, dependent on composition of the compression material 6152 and the compressive strength of the spring 6153 (e.g., bout 2.5 to about 4 inches, or more preferably about 3-3.5 inches), before arm 432 begins to rotate around a lower pivot point 643 (not shown in detail in FIG. 6), for example, similar to the pivot point 543 of the upper pads 445 and arms 442. According to a certain embodiment, the arm 42, for example, rotates a maximum of about 5-20 degrees (more preferably on the order of about 12 degrees, which in the particular embodiment corresponds to about 1.4 inches of movement).

Figure 7:
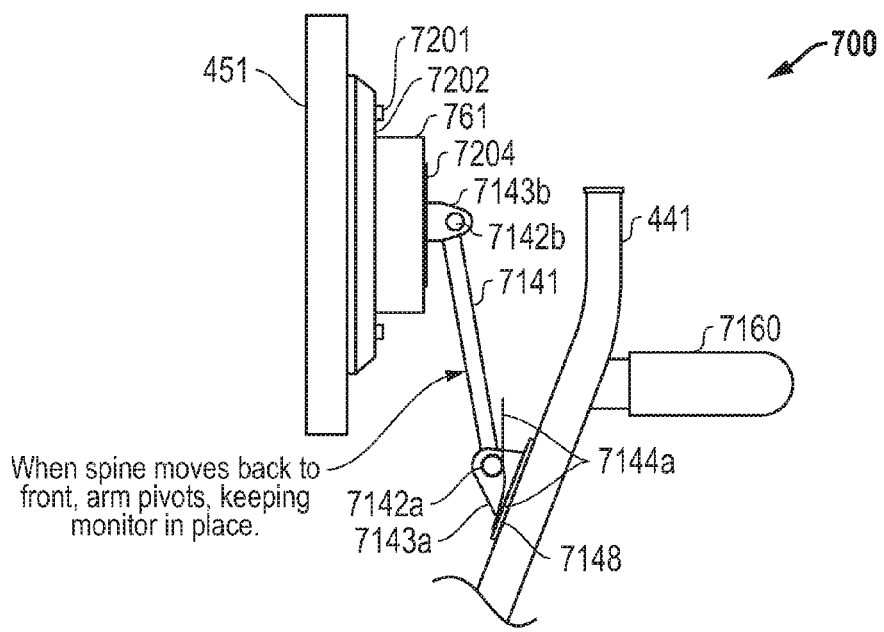
FIG. 7 illustrates a side view of a video assembly attached to a frame of an exemplary embodiment of a boxing apparatus (such as the embodiment of FIG. 4), according to certain embodiments of the invention.

Referring to FIG. 7, in conjunction with FIGS. 4-6, the video assembly 451 is attached to the upper frame 441 in certain exemplary embodiments. The video assembly 451 includes a visual display, for example, a liquid crystal display (LCD) (e.g., about 17-19 inches in viewing area, such as a Samsung SyncMaster 932 BW or other), another flat panel display, or other video display, and audio speakers 116 (shown in FIG. 1) (e.g., speakers integrated as part of the LCD display or separate from the display). The video assembly 451 may be capable of showing high definition images, video and graphics. Any of a number of different types of video/speaker assemblies may be included. The video and/or speaker, as applicable in the embodiment, is communicatively connected to the control unit 112, such as by wire or wireless link. Alternately, the display and/or speaker, as well as other peripheral device(s), can be separate from the upper frame 441, otherwise attached to or integrated with the frame or other portion of the boxing apparatus 411, or one or more peripheral device(s) communicatively connected to the control unit 461 of the boxing apparatus 411.

Referring to FIG. 7, in conjunction with FIGS. 4-6, an exemplary embodiment of an attachment mechanism 700 attaches the video assembly 451 to the upper frame member 441. This attachment mechanism 700 can reduces movement and vibrations of the video assembly 451 when a user hits the boxing apparatus 411 (i.e., avoiding impact on the viewing experience from the video assembly 451). The attachment mechanism 700 can also reduce chance for a user to hit the video assembly 451 or damage it, if the video assembly 51 is mistakenly hit when the user is aiming at the upper "head" punching pads 445. A further possible configuration in the embodiment, location of the video screen 451 behind the leading edge surface of upper head punching pads 45, for example, by about at least 8-12 inches, and more preferably about 10 inches behind the front edge of upper "head" pads 445 in a resting position, further limits possibility of hit or damage to the video assembly 451.

Continuing to refer to FIG. 7, in conjunction with FIG. 4, according to an exemplary embodiment, a stabilizing arm 7141 is connected to the upper frame 441 by a pivot pin 7142a attached to a bracket 7143*a*. To minimize vibration from frame 441 to the bracket 7143*a* (and ultimately to video assembly 451), the bracket 7143*a* is attached to the frame 441 by an elastomeric damping material 7148. This material may be any of a number of different damping materials such as rubber, plastic, gels or a combination thereof and/or other materials. A bracket 7142*b*, pivot point 7142*b* and torsion spring 7144*b* (not shown in FIG. 7) may be also attach the other extent of the stabilizing arm 7141 with the video assembly 451, in a similar manner. An example of the torsion spring 7144*a* or 7144*b* is a 180 degree spring in slight tension due to the weight of video assembly 451, or other as desired for the configuration and requirements of use. Ends of the respective torsion spring 7144*a,b* rest on the inside of stabilizing arm 7141*a, b* and bracket 7143*a,b*, respectively. Upper frame 441 also, or in alternative, may have a handle 7160 connected to the upper frame 441, to raise and lower the telescoping upper frame 441.

Figure 8:
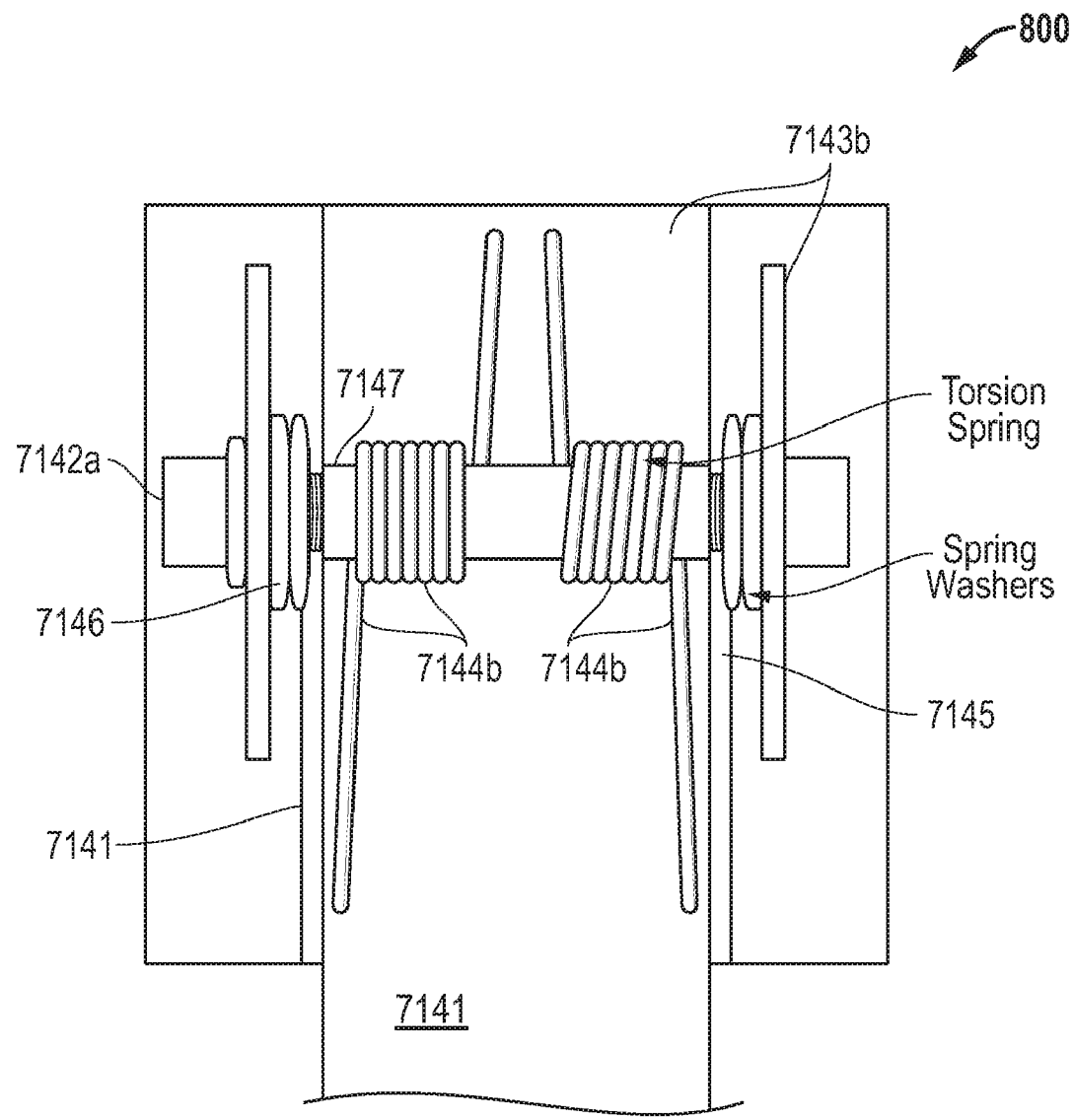
FIG. 8 illustrates a cutaway of a pivot point of an arm of an exemplary embodiment of a boxing apparatus (such as the embodiment of FIG. 4, according to certain embodiments of the invention.

Referring to FIG. 8, in conjunction with FIG. 7, an assembly 800 of the pivot point 7142*b* and bracket 7143*b* (as viewed from right side of FIG. 7 to left side of FIG. 7, as though standing to the right side of the illustration of FIG. 7 and gazing to the left) includes a bolt 7145 passed through the bracket 7143*b*. The bolt 145 acts to pivotingly connect the stabilization arm 7141 to the bracket 7143*b*. The pivot point 7142*b* also comprises spring washers 7146 and a sleeve 7147 over which the tension spring 7144 fits. To prevent over rotation of the stabilization arm 7141, blocking means may, if desired, be included as part of pivot point 142 (not expressly shown). The pivot point 7142*a*, bracket 7143*a* and tension spring 7144*a* are similarly configure but with opposite orientation of the bracket 7142*a* in connection with the upper frame 141, with top-side and downside reversed and facing the upper frame 141 from opposite direction (in the view of FIG. 7).

Continuing to refer to FIG. 7, in conjunction with FIGS. 4-6, a back side (right side in the view of FIG. 7) of the video assembly (i.e., display or monitor) 451 includes one or more plate 7201 which is bolted or otherwise affixed to the video assembly 451. One or more rubber (or elastomeric) gasket 7202 is attached to the video assembly 451 to aid dampening of any vibrations to the video assembly 451. According to certain embodiments, a control unit 761 of the boxing apparatus 411 is attached to the gasket 7202 of the plate 7201. The bracket 7143*b* is attached to the control unit 761 and a second rubber (or elastomer) gasket 7204, with the gasket 7204 located between the control unit 761 and the bracket 7143*b*. The gaskets 7202 and 7204 can also dampen vibrations from frame 441 to the video assembly 451 (and the control unit 761, if located in such manner of FIG. 7). One embodiment as an example of the bracket 7143*b* is a VESA bracket welded or otherwise joined of attached to a bracket substantially similar to the bracket 7143*a*. Such a VESA bracket allows for standardization to fit many different makes and models of display. Although the various brackets, pivot points, tension springs and other aspects have been described, substitution, deletion or alternatives to those described are possible in the embodiments as will be apparent.

For example, although the control unit 761 is attached to the video assembly 451 in the embodiment of FIG. 7, the control unit 761 can alternately be attached to the boxing apparatus 411 at other locations or components, for example, to the upper frame 441, the lower frame 431, the base 421, or otherwise. Moreover, in other alternatives, the control unit 761 can be merely communicatively connected to the boxing apparatus 411 and residing physically apart from the boxing apparatus 411 as a unit. In such alternatives, communicative connection of sensors, display, and speaker, as well as other devices and peripheral units, can be by wired, wireless, infrared, BlueTooth™ or other components and technologies. Thus, the disclosed orientations and configurations of embodiments are intended to be merely illustrative and others are possible, as will be understood from the disclosure.

The control unit 761, whatever the communicative connection for the boxing apparatus 411 of the exemplary embodiments, substantially accords with the control unit 200 of FIG. 2. The control unit 761 includes, for example, one or more processor, memory, and output (and/or input) connections to any display or speaker. In alternatives, the control unit 761 may additionally have one or more controllers for connection to and control of the impact sensor(s) of the pad(s). In other alternatives, the control unit 761 may include other input and output connectors (I/O), data communication elements for external link of the boxing apparatus (such as a computer or other I/O port, a telephone (POTS) modem, and Ethernet controller, a radio for wireless connection, or others). In one example of alternatives, the control unit 761 includes components connecting to a network, for example, the Internet or another data or other communication network.

According to certain embodiments, the control unit 761 connects to and communicates with the video assembly 451, including speakers, to deliver to a user of the boxing apparatus 411 varied content (such as has been described, but also may include radio, television, web content, and other information) and interactive feedback while boxing or otherwise using the apparatus 411. Even further, the boxing apparatus 411, dependent on the particular control unit 761, video assembly 451, and other components or peripherals, provides great flexibility for different types of user experiences during use of the apparatus 411. For example, a variety of different types of content and information can be processed by the control unit 761, input and output or made available to the user through applicable I/O elements connected to the apparatus 411. Thus, the user is able to experience standard TV, including for example via a DVD or DVR player, a gaming machine, such as a computer or the Xbox 360™, Nintendo™ or Playstation™ consoles, or other media devices communicatively connected to the control unit 761 of the apparatus 411. In various embodiments and alternatives, media content is downloaded to the control unit 761, or to storage communicatively connected therewith, by DVDs, CDs, SD cards, flash drives, from the Internet, and/or other external source. Possible video, audio and other media used in or in connection with the apparatus 11 can be through simple implementation to the more complex implementation.

Figure 9A:
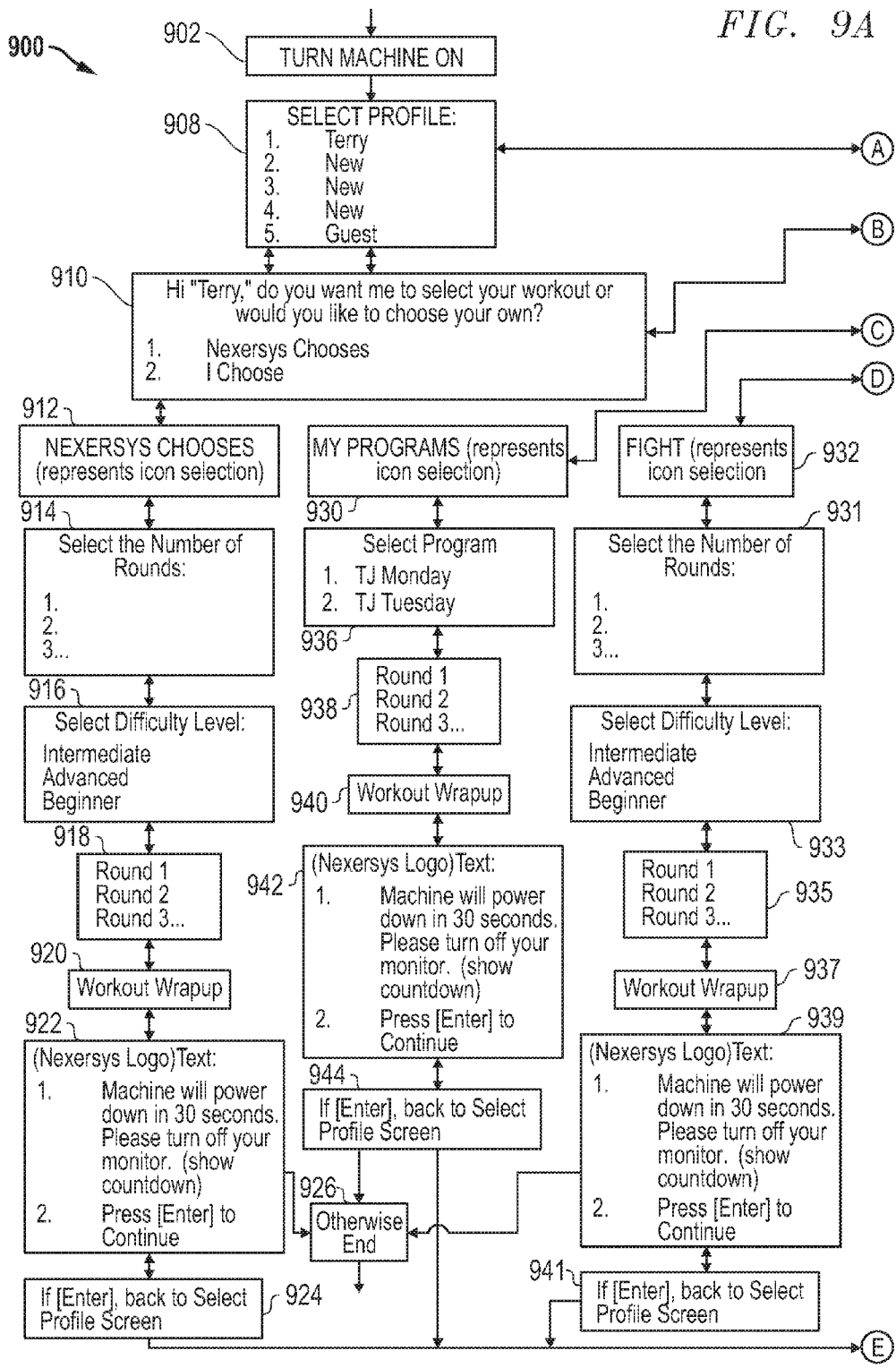
FIG. 9 illustrates an exemplary method of boxing by a boxing apparatus, according to certain embodiments of the invention.
Figure 9B:
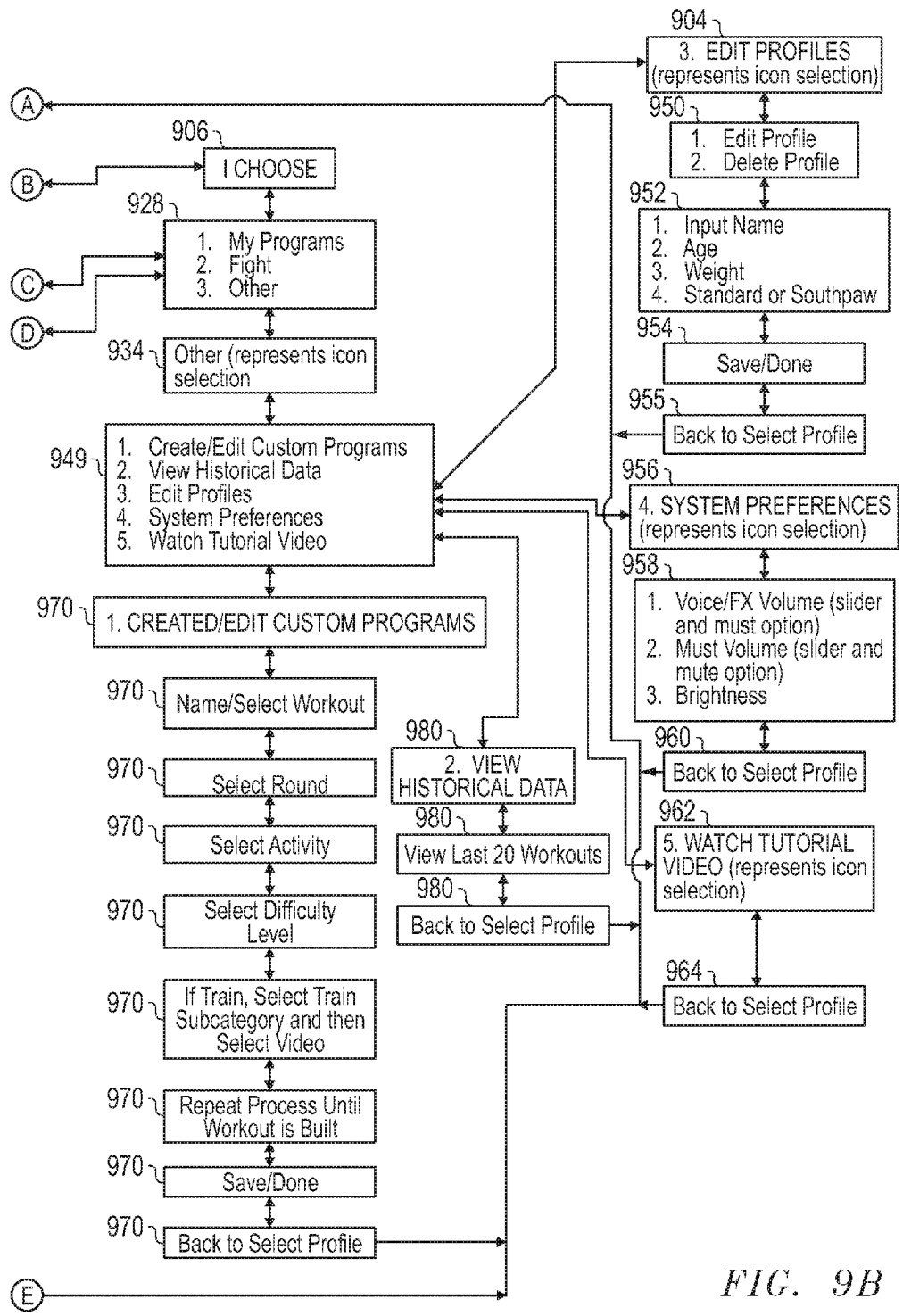

Referring to FIG. 9, in conjunction with FIGS. 4-8, an exemplary method 900 of operation of the boxing apparatus 411, and in particular of the control unit 761 and user interface for input and output of information, video and audio during boxing, commences with a step 902 of powering on the control unit 761. The control unit 761 boots via an operating system (for example, Unix™ or a variant, or other operating system software stored in a computer readable non-transitory memory of or connected to the control unit 761) and activates the video assembly 451 (as well as any speaker) to an on state.

Initially in the method 900, once the control unit 761 and the video assembly 451 are powered on (for example, by the user flipping a switch of the apparatus 411 to power "on" from "off" or, if already powered on, entry of a select indicator), the control unit 761 processes and directs display of an interface graphic in the step 908. The graphic may, for example, request input to the apparatus 411 in the step 908 to display in the video assembly 451 of identifiers for one or more user profile for the user. In response to the step 908, the user of the apparatus 411 may select one of the identifiers displayed in the video assembly 451, corresponding to any profile (previously input by the user) stored in a computer readable non-transitory memory or otherwise a guest profile or new profile (to be created by the user in a step 906 as later described). Each profile for the user is created in steps 904, 950, 952, 954, 955, 956, 958, and 960, responsive to the control unit 762 processing and directing display in the video assembly 451. Displays in the video assembly 451 during creation of profiles based on input by the user in the steps 949, 950, 952, 954, and 955, include create profile in a step 949, edit/delete profile in a step 950, input of relevant information for the user in a step 952, save in a step 954, to the apparatus 411. Other relevant information for use of the apparatus 411 by the user may include responsive input to displays of the video assembly 451, for example, selection of system preferences in a step 956 and system effects in a step 958. In each instance, the user's input to the apparatus 411 is by touch or tap of the pads. For example, any particular input is made upon detection by the impact sensor of the pad and signal by the impact sensor to the control unit 761 of such detection. According to particular pad touched or tapped by the user corresponding to the user's desired selection, the control unit 761 processes the detected touch or tap to the pad and thereby directs an applicable corresponding action, such as display by the video assembly 451 for successive steps of the method 900.

Once a profile is established by a user (and, in the case of a previously created profile, such profile is saved in storage by the apparatus 411), the method 900 proceeds with graphical display in the step 908 by the video assembly 451 for selection of indicator of the profile. In response to the step 908, a particular profile (from among one or more) is selected by user input to the apparatus 411. In making selection for input to the apparatus, for example, a user may touch or tap a correspondent punching pad 445 of the apparatus 411, which is detected by the impact sensor of the pad 445 and signaled to the control unit 761 as an indicator of the selected profile.

On input of the profile indicator in response to the step 908, the control unit 761 directs the video assembly 451 to display a next graphic interface in a step 910 for selection of system programmed boxing 912 of the apparatus 411 (e.g., type of workout, such as Fighting, Training, or another) and/or another operation or program of the apparatus 411 (i.e., such as the step 906, as later discussed). In response to the step 910, the control unit 761 may receive input by the user to the apparatus 411 corresponding to either selection of a next step 912 or step 906. If the step 912 is selected, for example, by user touch or tap to a punching pad 445 corresponding to a displayed identifier for the selection, an indicator of the selection is input to the control unit 761 and the control unit 761 processes and directs programmatic boxing 912 of the apparatus 411.

In successive steps 914 and 916 for the programmatic boxing 912, the control unit 761 directs the video assembly 451 to display subsequent graphics for selection of specific items for the programmatic boxing 912 with the apparatus 411. In the embodiment, a number for boxing rounds is input to the control unit 761 in the step 914 and a user level is input in the step 916. Each input is, for example, by user touch or tap to a corresponding punching pad 445 for the selection, detection of the touch or tap by pad's impact sensor, and directed input by the sensor to the control unit 761 for continued processing. Upon inputs as requested in the display, a step of boxing of the apparatus 411 commences in a step 918, through successive rounds per the number of rounds previously input.

Figure 10:
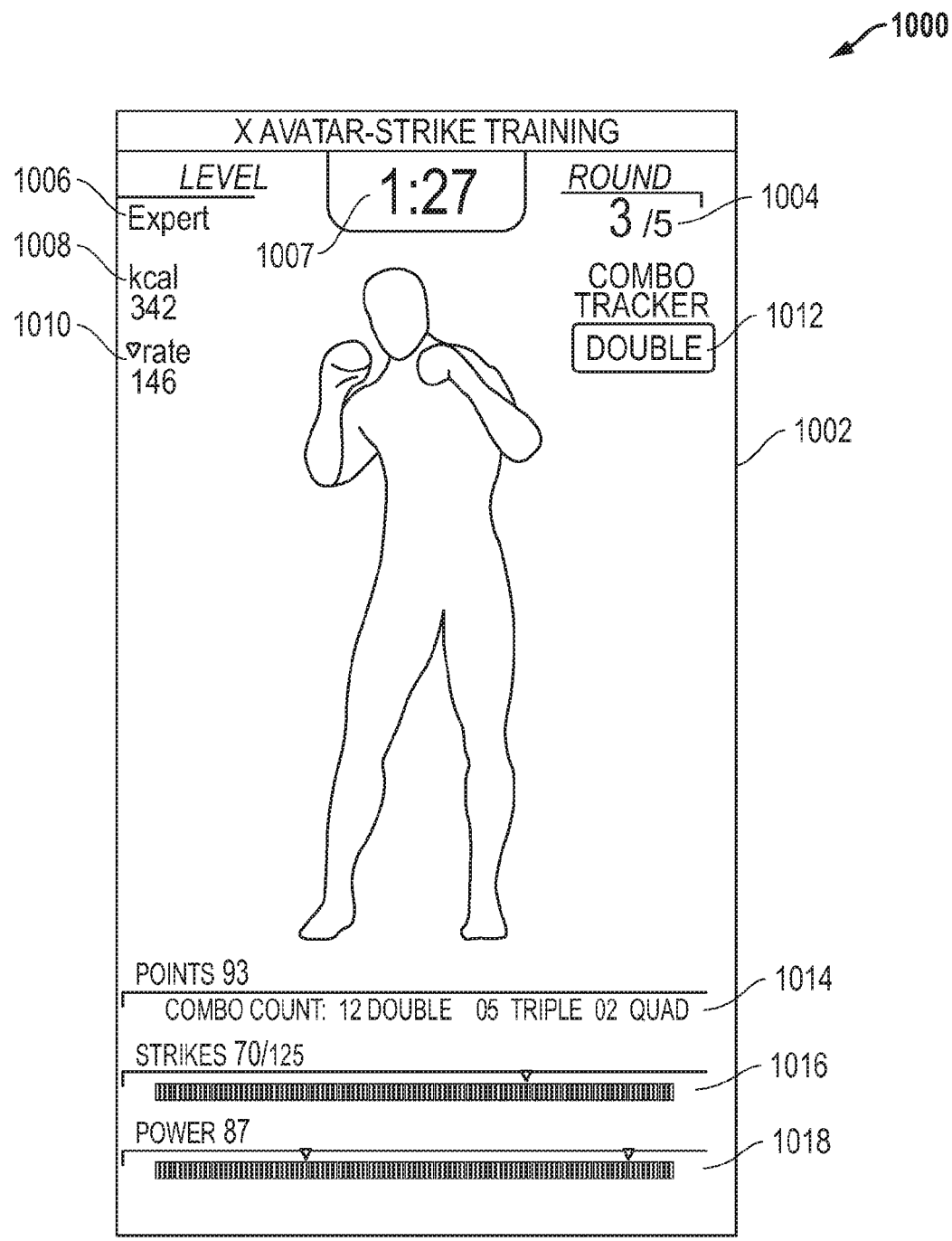
FIG. 10 illustrates an exemplary avatar fighter interface displayed by a video assembly of a boxing apparatus, in a fighting sequence, according to certain embodiments of the invention.

Referring to FIG. 10, in conjunction with FIG. 9, the control unit 761, during the boxing routine 918, processes inputs received from the impact sensors in response to punches and kicks of the user to the pad(s), and directs the video assembly 451 to display animated video graphics 1000 of an avatar fighter 1002 in the embodiment. Based on inputs of the user by punch and kick to respective pads 445, 435 and detection by the impact sensors and corresponding signal to the control unit 761, the avatar fighter's movement in display in the video assembly 451 is controlled by the control unit 761 to mimic a sparring partner's movement. The video graphics 1000 also display real-time information content, based on impact sensor detections processed by the control unit 761. In respect of the detections, the control unit 761 directs display by the video assembly 451, for example, of round identifier 1004, user-selected level identifier 1006, a timer 1107, a user's heart rate indicator 1008, a user's calories expended indicator 1010, a user's punch combination tracker 1012, a points scored summary 1014, a number of strikes tracker 1016, and a power of punch tracker 1018 displayed for each punch and kick to any respective one of the pad 106.

Referring back to FIG. 9, upon completion of the boxing 918 of the apparatus 411 (unless the step 918 of the boxing routine is interrupted by the user, such as by turning-off power to the apparatus 411 or the user's entry of an exit indicator to the control unit 761), the method 900 proceeds to a step 920 in which the control unit 761 directs the video assembly 451 to output a workout wrapup result. A graphic interface processed and controlled by the control unit 761 is then directed for display by the video assembly 451 in a step 922 to allow responsive input from the user to continue using the apparatus 411 or otherwise the apparatus 411 powers down in a step 926. If input is received by the control unit 411 via the user's touch or tap selection of relevant pad to continue use of the apparatus 411, the method 900 returns to the step 908 of display on the video assembly 451 to select a profile.

As previously mentioned, after the step 908, the step 910 of the method 900 allows user-selection alternatively (instead of selection of step 912) of the step 906. In the step 906, the control unit 761 directs display in the video assembly 451 in a step 928 for selection by the user of either user-programmed training 930, user-programmed avatar fighting 932, or other action 934 of the apparatus 411 in the embodiment. If the user's responsive touch or tap selects user-programmed training in the step 928, the control unit 761 processes the user-programmed train or spar routine in a step 938. If the user, however, responds by touch or tap to select user-programmed avatar fighting 932, the control unit 761 directs the video assembly to display a number of rounds selection screen in a step 931, followed by a difficulty level selection screen in a step 933, and commences user-programmed avatar fighting in a step 935. A user's responsive selection in the step 928 of other options allows the user access in the steps 934 and 949 to customize routines and other operational features of the apparatus 761. For example, in a step 980 the control unit 761 directs display in the video assembly 451 of series of historical boxing information for the user and in a step 970 the control unit 761 directs display in the video assembly 451 of series of user programmatic selections for customized user-programmed train and avatar fight routines for user creation. As with other user-interaction with the apparatus 411, the impact sensors detect touch or tap of correspondent pad(s) for user selections, the control unit 761 receives indication from the impact sensors, and the control unit 761 processes next direction to the video assembly 451 accordingly.

If responsive to the step 928 the control unit 761 receives input from impact sensor for either the user-programmed training 930 or the user-programmed avatar fighting 932, rather than selection of other action 934, the apparatus 411, as directed by the control unit 761, commences the corresponding step 930 or the step 932. In the step 932 in respect of a previous user-initiated avatar fighting routine input and saved by the apparatus 411, the method 900 proceeds with a step 931 in which the control unit 461 directs display by the video assembly 451 for selection by the user of number of rounds for the avatar fight. A step 933 follows a responsive input (by the user via touch or tap of a select one of the pads) of a particular identifier for a number of rounds from among displayed choices. In the step 933, the control unit 761 directs display in the video assembly 451 for selection of a difficulty level for the avatar fight. Boxing with the avatar fighter in a step 935 then proceeds for the apparatus 411, through successive rounds (if more than one). During the step of boxing 935, the control unit 761 directs display in the video assembly 451 of sequences similar to those of FIG. 10.

If in the step 928 the user's response is selection of a user-programmed routine for processing by the control unit 761 of user-programmed training 930 in the apparatus 411 of the embodiment (i.e., rather than user-programmed avatar fighting 932), the method 900 proceeds with a step 936 in which the control unit 761 directs display in the video assembly 451 of a program item selection screen. Responsive to selection of a program item by the user, the impact sensors detect the touch or tap selection to the pads and the control unit 761 processes the applicable user-programmed train routine in a step 938.

Figure 11:
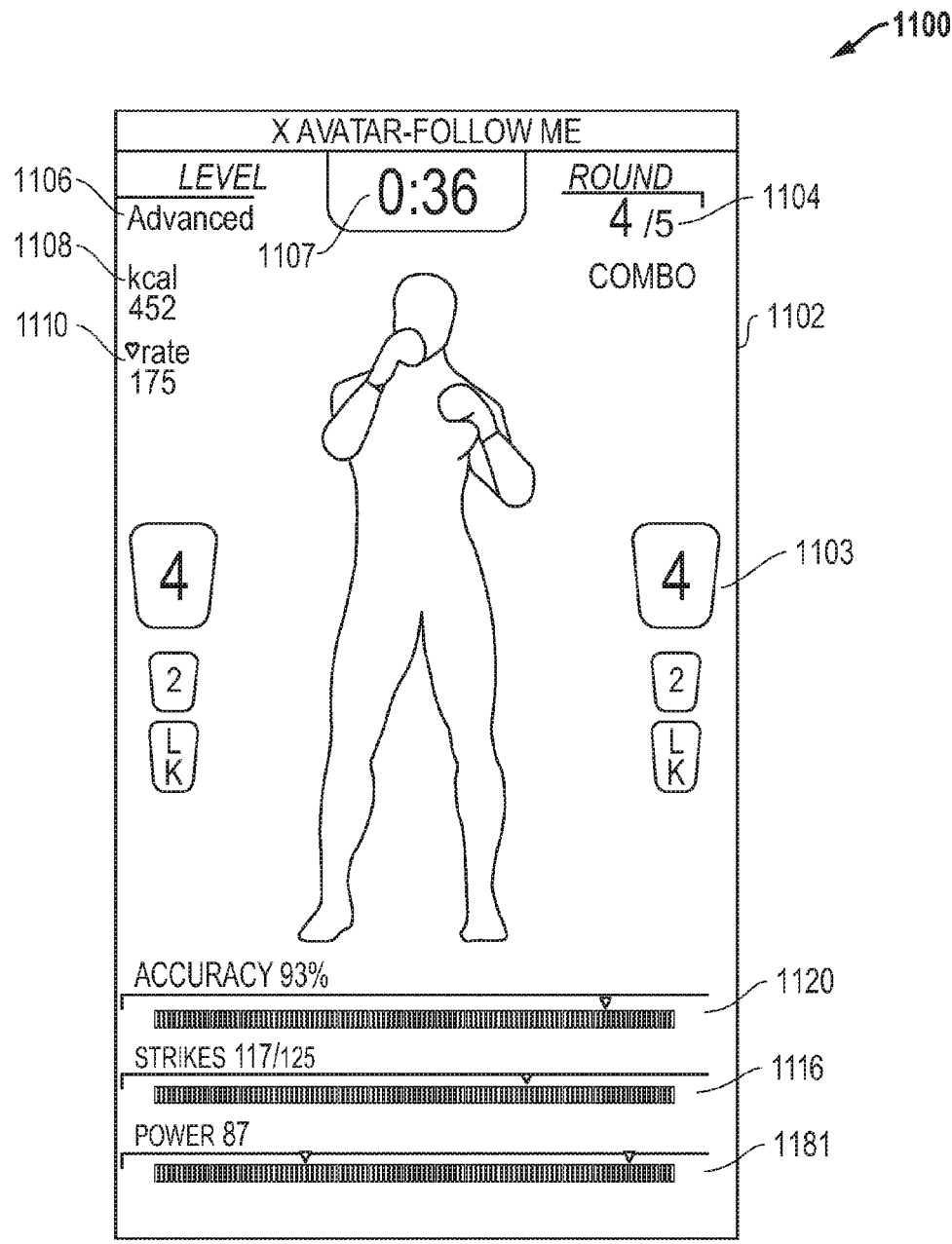
FIG. 11 illustrates an exemplary graphic pad layout and avatar fighter interface displayed by a video assembly of a boxing apparatus, in a training sequence, according to certain embodiments of the invention.

Referring to FIG. 11, in conjunction with FIG. 9, in an example of operation of the apparatus 411 in processing a user-created routine of boxing 938, the control unit 761, during the boxing routine 938, directs the video assembly 451 to display animated video graphics 1100 of an avatar fighter 1102 and a graphic portrait 1103 of relative locational arrangement of the pads of the apparatus 411. This graphic portrait 1103 automatedly leads the user through sequences of punches and strikes to the pads. As a pad or series of pads is highlighted in the graphic portrait 1103 during processing of the boxing routine 938, the user can respond by punches and strikes in efforts to follow the order of sequences displayed. The animated video graphics 1100 also display real-time content, including, for example, round identifier 1104, level identifier 1106, a user's heart rate indicator 1108, a user's caloric expenditure indicator 1110, a number of strikes tracker 1116, a power of punch tracker 1118, and an accuracy of punch (including correct pad as well as punch response timing) tracker 1120. Additionally, a fighter avatar 1102 of the animated video graphics 1110 can portray a location of punch to the avatar 1102 conforming to the pad punched or kicked.

Continuing to refer to FIG. 9, upon completion of processing of the boxing routine by the control unit 761, upon completion of the user-programmed avatar fighting 932 or of the user-programmed training 930 of the apparatus 411, the method 900 proceeds to either step 937 or step 940, respectively, in which the control unit 761 directs the video assembly 451 to output a respective workout wrapup result. A graphic interface processed and controlled by the control unit 761 is then directed for display by the video assembly 451 in step 939 or 942, respectively, to allow responsive input from the user to continue using the apparatus 411 or otherwise the apparatus 411 powers down in a step 926. If input is received in the step 941 or 944, respectively, by the control unit 411 via the user's touch or tap selection of relevant pad to continue use of the apparatus 411, the method 900 returns to the step 908 of display on the video assembly 451 to select a profile.

In an exemplary embodiment, for example, the control unit 761 and video assembly 451 (with incorporated speaker) are employed by the user as a teaching tool. For example, the apparatus 411 outputs a standard (or customized) video that may teach a user how to punch and kick by watching a professional in the video.

In another embodiment the content played on video assembly 451 may be used as a motivational tool used to spur on a user to exercise harder and follow what the instructor on the video is doing (e.g. the type of exercise video first made popular by Jane Fonda). This motivational video content might not even be directly associated with boxing apparatus 411. For example it might be a video urging a user to jump rope for a certain period of time or stretch. The teaching and motivational exercise may be combined in content such that, for example, the video urges on the user to jump rope for 60 seconds and it may also help teach them proper technique by showing proper jump roping on video assembly 451.

While video assembly 451 can be used with control unit 761 as a standalone teaching and/or motivational exercise tool, the primary use of apparatus 411 is as a interactive tool for people using it in a boxing or martial arts mode. In this mode the user is both watching and listening to video assembly 451 while also punching or kicking the mechanical portions of apparatus 411. In order for apparatus 411 to be interactive and give a user feedback on how they are doing, control unit 761 is also in communication with impact sensors 110 embedded in the punching units 445 or kicking units 435. The communication between sensors 110 and control unit 761 can be hard wiring or wireless connection, or other present or future communicative connection.

As a punching pad 445 is struck it moves and impact sensor 110 senses this impact or movement and communicates the impact to control unit 761. Control unit 761 is capable of processing the communicated impact in a wide variety of ways to display in the video assembly 451, store, or otherwise respond in the apparatus 411. For example, the control unit 761 may record in storage which of the punching pads was struck and when the impact occurred. Also, it may record in storage how hard the pad or pads were struck. The control unit 61 performs these tasks for all the various punching pads and kicking pads and thus has records of what the user did during a training or exercise routine (earlier sessions may also be stored in control unit 761 and, if so, workout or training trends and history may be analyzed and shared with the user via output of the apparatus 451, such as display in the video assembly 451). The information recorded and analyzed by the control unit 761 can then be fed back to the user through video assembly 451 or even shared with a separate personal computer, personal digital assistant (PDA), cell phone or other processing device of the users. For example during a particular session the user might know that they had made 11 left punches to the head, 3 rights to the head, 14 rights to the body, 9 lefts to the body and 3 upper cuts. The feedback might also let the user know that toward the end of the routine his punches were getting progressively weaker and/or that the punches were coming at a slower rate toward the end of the session.

In training or exercise routines where the user is following directions on punching or kicking from the video assembly 451, it may be desirable for the impacts on the punching pads to be time stamped and then compared (i.e. synchronized) to the video directions to see how a user is doing. In this embodiment, the video instructions to the user may be in the form of an avatar on video assembly 451. The avatar may have visual clues telling the user which pads to hit on the machine. For example, the left side of the avatars head may light up and show the user that they need to throw a right hand jab to the head. If the jab is done quickly enough after the signal to punch has been given then this may score points for the user. The avatar may be used as a "score keeper" of sorts as the avatar changes appearance as punches are thrown. For example the avatar may begin to slump or groan (audible clue) or portions of the avatars body may change color as pads 45 are struck. As just an in exhaustive example, when a user has hit a particular pad 45 enough times in a round, the corresponding section of the avatar might turn a red color to show that the user doesn't need to hit that pad anymore (during the series of strikes prior to the red color the avatar's body in this particular area might be gradually changing from a green color to a yellow to an orange and then finally to red).

In this interactive mode, the control unit 761 processingly compares the video instructions to see what the user physically did to the punching pads at that approximate point in time. If the punch was too slow after the direction from the video to punch a particular pad 445 that delay can be noted by control unit 761. Likewise, if the punch was to the wrong pad that can also be noted by the control unit 761. In fact, in either of the cases above a punch that is too slow or to the wrong pad the feedback might also come in the immediate form of a sound from video assembly 451 (e.g a bong sound that the wrong pad was struck). According to certain embodiments, LED lights (not shown in detail in the Figures) integrated to the striking surface of the pad may either light up or fail to light up to show a user how they are doing in real time. When an avatar is shown in the video assembly 451 the avatar can have lights and/or sounds that give feedback to the user.

The control unit 761 may support and allow a user selection from among different levels of difficulty for training and fighting. These different levels are likely to have different standards for reaction time, power of the punches and so forth. For example, once the signal has been given to hit upper left hand pad 445 a beginner might have 1 second to hit that particular pad while an expert might have only half a second to hit the right pad in order to have a successful punch.

For some users and in some types of sessions in use and operation of the apparatus 411, real time feedback may not be desirable. Therefore, apparatus 411 can also have storage for containing data from a routine. In such instance, the control unit 761 may at later time or date process and analyze data of the routine, such as at the end of processing of the routine and then give the user summary feedback. Video assembly 451 could also inform a user either visually (using charts, graphs or simple data) or audibly of added content and information, via processing by the control unit 761 and directed display in the video assembly, of items such as, for example, how the user performed during the session, that during the latest 3 minutes or other particular period of the workout the user hit a particular percentage (e.g., 91%) of particular pad or pads (for example, the right pads) within the expected time per the difficulty level or routine, average numbers or statistics relevant to force, sequence, and/or accuracy of punches (e.g., that the force of punches was an average of a 4 on a scale of 5), and other processed indicia. Details such as which of punches (e.g. a right jab) is least accurate or most late may also be processed by the control unit 761 and displayed or otherwise given to the user. Some users may desire to have both real time feedback (e.g., sounds and lights during the routine) and summary feedback at the end. When giving real time feedback, the control unit 761 may, for example, control the video assembly 451 to display recent or historic performance of the user through various graphs, charts or the like (e.g., by a rolling bar displayed in the video assembly 451, showing in real time punches versus direction through processing of routine by the control unit 761 for display of instructions to the user as to action and respective reaction to the instructions). In the case of such graphs, charts or the like, the control unit 761 may direct display in the video assembly 451 of color coding for the different punches and the users success or failure. An example of a rolling bar display for such content in video assembly 451 might be similar to that of the computer game "Guitar Hero" except displaying punches and punch sequences to a fighter avatar or pad arrangement as opposed to musical notes.

In various alternative embodiments, the fighter avatar is controllingly directed by the control unit 761 to display in the video assembly 451 as bobbing and weaving like a boxing opponent and/or throwing punches back toward the user (e.g., 3-D effects and like can also be possible for the avatar in certain alternatives). In embodiments providing avatar display in a moving scenario, for example, the avatar may throw a "haymaker" or "round house" punch to the user and the user may score extra points if a number of combination punches to the body of the avatar is hit or returned. The control unit 761 additionally may store and provide display of records of punching combinations and give feedback or rewards (e.g. a higher score) based upon the user combinations. In certain embodiments, the avatar, as controlled by processing of the control unit 761, may synchronize motions in response to the user's punches and strikes and deliver offensive motions to the user, such as in an actual fight scenario. In further embodiments, location sensors (similar to location sensors in hands free hygiene apparatuses or otherwise) may be attached to the user's hands to keep track of the location of the user and to provide automated input to the control unit 761 for use in processing and display. In such an embodiment, for example, if the user does not duck when the avatar is throwing a punch at the user's head, the control unit 761 may record the failure to move out of the way as a strike by the avatar and result in a commensurate reduction of points from the user or addition of points to the avatar. Various game implementations of the apparatus 411 and its operations and use are, thus, possible and included for purposes of this disclosure.

In certain embodiments, a user may spar with another user of the apparatus 411 from a remote location. In such embodiments, the avatar on user A's screen may mimic the actual motion of user B on the remote apparatus 411. For example, the Internet or other network connection provides communication between respective apparatuses 411 at the locations. In such example, respective apparatuses 411 can in various embodiments include location sensors (not expressly shown) and/or video camera elements (not expressly shown) for displays of respective user sparring partners in the respective video assembly 451. A user may thereby virtually fight a remote friend and even have the respective control units 761 of the apparatuses 411 track how each respective user is doing vis-á-vis his remote opponent.

In certain embodiments making the apparatus 411 as flexible as possible for a wide variety of uses, the control unit 761 can be designed to process wide variations of software and content, including, for example, network downloadable or user uploadable software and content. For example, if a user wants to do 3 minutes of warm up before then doing a 3 minutes training session on how to jab, the user should be able to simply and easily tell the controller what they want to do through an interface of the control unit 761, for example, an interface directed by the control unit 761 for display in the video assembly 451 and responsive to detection of touch, tap, punch and strike to pads by impact sensors connected to the control unit 761. In examples of such interface in the apparatus 411, the user may be able to pick and choose from among various sessions in an a la carte fashion or choose popular menus of various sessions that have been prearranged and run/processed by the apparatus 411 automatically from storage or other source. Moreover, users may be able to design (and store within control unit 761) various menus of sessions, such as prearranged personally by the users for the interface in connection with work out or training session of their own design.

According to certain embodiments, communicative connection of the apparatus 411 to a communication network, such as, for example, the Internet, a local area network, some other wide area network, peer-to-peer connection, or other connection between and/or among apparatuses 411, can provide user sharing of routines, menu arrangements, user-created software, user/community communication, and other sharing and community aspects of use, devices, operations, and other features of the apparatuses, methods and embodiments. According to certain embodiments, for example, a user community of communicatively connected apparatuses may be operated by a central authority or a user (e.g., by subscription or otherwise); users may share information relative to the apparatuses, methods and embodiments through wireless, wired and other communicative connections; communicative connections of the apparatus can allow a user to connect to and make available to other devices various information, games, routines, results, and the like; and a wide variety of other options and devices may be used on, in or in connection with embodiments.

Because many users of the embodiments will be wearing boxing gloves and will not be able to type, punch small buttons or use a touch screen, certain embodiments enable the user to move one or more of the punching pads (even with their gloves on) and have these gross movements of the pad signal the control unit 761 of user selections and other inputs for processing. For example, tapping on one of the pads 445 brings up a user interface screen on video assembly 451 and the user navigates around this user screen using gross movements on pad 445. In certain embodiments, the impact sensor 101 for each pad is a three axis accelerometer that senses movement in various spatial directions. For input to the control unit 761, the user can "click" on a displayed interface or otherwise by touching or tapping a relevant pad on a link or selection of interest. In other alternatives, the control unit 761 includes elements for speech capture and recognition and is responsive to a user's voice via such elements. Such voice-enabled alternatives of the control unit 761 can also allow disparate but communicatively connected devices and methods to operate in or on the embodiments of the apparatus and method.

In certain further embodiments, as previously mentioned, the control unit 761 includes elements and connections for Internet communications. In such Internet-enabled embodiments, the apparatus 100, 411 is useable for interactive games, for example, where a user at one location "spars" with a user at a different location. These example interactive games would be greatly more desirable than "shadow boxing" an opponent with a joy stick or a Wii™ type apparatus with a computer or processor device. Interactive "on-line" fighting via the embodiments could be accompanied by scores that allow a user to compare his score with those another person score on a real time basis (or a delayed basis, according to applicable embodiment or user selections). Unlike other games which do not require proper boxing or MMA techniques, the embodiments can require that the user strike the pads with proper technique in order to obtain maximum score. For example, if the user strikes too easily or too hard, or if the user doesn't use the preferred combinations as directed by the control unit 761 in the video display 451 or according to proper techniques, the score of the user is not maximized. Such combinations of striking, combination scoring, power monitoring and reactions to what the avatar (or remote party, etc.) is doing can all combine to help teach and train a user how to box most effectively. If the user is not boxing effectively, the control unit 761 can process stored or communicated instructional media, information, or other content, for display in the video assembly 411, such as to explain to the user what he needs to do in the future to perform better.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and device(s), connection(s) and element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An interactive boxing apparatus, comprising:
a frame;
a plurality of arms, each arm of the plurality of arms distinctly connected to the frame and outwardly extends from the frame;
a plurality of individual pads, each individual pad of the plurality of individual pads exclusively connected to a distinct one of the arms, each arm having at least one pad distinctly connected to the arm;
a plurality of impact sensors, each impact sensor of the plurality of impact sensors exclusively communicatively connected to a distinct one of the individual pad, each individual pad having at least one impact sensor distinctly connected to the individual pad;
a control unit communicatively connected to each impact sensor of the plurality of impact sensors; and
a display connected to the control unit.

2. The apparatus of claim 1, further comprising:
a speaker connected to the controller;
wherein the controller controls the speaker to output audible commands for boxing.

3. The apparatus of claim 2, further comprising:
a fighter avatar graphically depicted in the display;
wherein the controller controls the speaker to output audible commands for boxing and controls the display to output the fighter avatar for boxing.

4. The apparatus of claim 1, wherein at least one of the impact sensors is a multi-axis detector, capable of detecting movement in more than one axis of motion.

5. The apparatus of claim 1, wherein at least one of the arm is capable of moving in more than one axis of motion upon boxing impact to at least one pad connected to the at least one of the arm.

6. The apparatus of claim 1, wherein the control unit, responsive to contact to at least one of the individual pad, as detected by the respective of impact sensor connected to the individual pad, accordingly controls the display and the speaker.

7. The apparatus of claim 6, further comprising:
an audio and visual instruction output by the display and the speaker, selected from the group of: a training sequence and an avatar fighting sequence;
wherein the control unit, responsive to contact to at least one of the individual pad, controls the media display and the speaker to output the instruction.

8. The apparatus of claim 1, wherein the display is connected to the frame and thereby positioned at about head height of a user of the apparatus.

9. An interactive boxing apparatus, comprising:
a movement resistive punch pad;
a movement sensor communicatively connected to the punch pad, for detecting any movement of the punch pad;
a processor connected to the movement sensor, responsive to detection by the movement sensor of movement of the punch pad;
a module communicatively connected to the processor, controlled by the processor, responsive to movement of the punch pad on detection by the movement sensor;
a media display communicatively connected to the processor, the processor directs output by the media display in response to control of the module by the processor;
a speaker communicatively connected to the processor, the processor directs output by the speaker in response to control of the module by the processor; and
a user instruction output by either the speaker, the media display, and the speaker and the media display, in combination;
wherein the module, as controlled by the processor, responds to movement of the punch pad by initiating the user instruction.

10. The apparatus of claim 9, wherein the movement sensor is a multi-axis detector, capable of detecting movement of the punch pad in more than one axis of motion.

11. The apparatus of claim 9, further comprising:
a fighter avatar graphically depicted in the media display;
wherein the controller controls the speaker to output audible commands for boxing and controls the media display to output the fighter avatar for boxing.

12. The apparatus of claim 9, wherein the movement sensor detects multi-axis motion of the movement resistive punch pad.

13. The apparatus of claim 9, further comprising:
an arm connected to the punch pad, wherein the arm provides movement resistance to the punch pad;
a frame connected to the arm, the frame retains the arm positioning the punch pad for proper boxing technique.

14. The apparatus of claim 13, wherein the arm is capable of moving in more than one axis of motion upon boxing impact to the punch pad.

15. The apparatus of claim 11, wherein the module under control of the processor, responsive to contact to the punch pad, as detected by the movement sensor connected to the punch pad, accordingly controls the media display and the speaker.

16. The apparatus of claim 15, further comprising:
an instruction output by the media display and the speaker, selected from the group of: a training sequence and an avatar fighting sequence;
wherein the module under control of the processor, controls the media display and the speaker in response to the movement sensor detecting contact to the punch pad, to output the instruction.

17. The apparatus of claim 14, wherein
the arm is pivotally connected to the frame and biased to resist pivoting unless forcefully overcome by punching; and
the arm includes a first segment pivotally connected to the frame and a second segment longitudinally connected to the first segment opposite the frame;
wherein the second segment is slidably connected to the first segment and biased to resist compressing in slidable connection to the first segment unless forcefully overcome by punching.

18. A method of boxing, comprising the steps of:
outputting a media item on a display, the media item identifies a distinct pad from among a plurality of pads, each pad, respectively, connected to a unique sensor, respectively, exclusively for the pad;
detecting a punch to the distinct pad by the unique sensor of the distinct pad;
signaling a controller by the unique sensor of the distinct pad in response to the step of detecting; and
controlling the media item on the display by the controller in response to the step of signaling.

19. The method of claim 18, further comprising the steps of:
outputting an audio command on a speaker, the audio command provides an instruction relating to the punch pad; and
controlling the audio command on the speaker in response to the step of signaling.

20. The method of claim 19, wherein the audio command is selected from the group of: a training sequence and an avatar fighting sequence.

21. The method of claim 19, wherein the steps of outputting the media item and outputting the audio command selectively respond to contact to the punch pad, based on whether contact is made within a predetermined time limit and whether contact is not made within a predetermined time limit.

22. The method of claim 19, wherein the step of outputting the media item displays in the display, in response to contact to the punch pad, a force of the contact, a time delay of the contact from either of the audio command, the media item, and combination of these, and a running count of contacts to the punch pad made within the time delay.

23. A method of boxing, comprising the steps of:
providing a frame, a series of arms connected to the frame and outwardly extending from the frame, one or more pad connected to respective ones of the series of arms, an impact sensor communicatively connected to each pad, a control unit communicatively connected to the impact sensor, and a display connected to the control unit;
outputting a media item on the display, the media item selecting a distinct pad from among the one or more pad, each pad, respectively, connected to a unique sensor, respectively, exclusively for the pad;
detecting movement of the distinct pad and an identity of the distinct pad so moved;
signaling a controller by the impact sensor with the identity of the distinct pad so moved; and
controlling the media item on the display by the controller in response to the step of signaling;
wherein the media item in the step of outputting selectively corresponds to the steps of detecting, signaling, and controlling for boxing instruction.

24. The method of claim 23, further comprising the steps of:
- outputting an audio command on a speaker, the audio command provides an instruction relating to the distinct pad; and
- controlling the audio command on the speaker in response to the step of signaling.

25. The method of claim 24, wherein the audio command is selected from the group of: a training sequence, an avatar fighting sequence, and a customized sequence.

26. The method of claim 24, wherein the steps of outputting the media item and outputting the audio command selectively respond to contact to the distinct pad, based on whether contact is made within a predetermined time limit and whether contact is not made within a predetermined time limit.

27. The method of claim 24, wherein the step of outputting the media item displays in the display, in response to contact to the distinct pad, a force of the contact, a time delay of the contact from either of the audio command, the media item, and combination of these, and a running count of contacts to the distinct pad made within the time delay for the plurality of pads.

* * * * *